US011682418B2

(12) United States Patent
Song et al.

(10) Patent No.: US 11,682,418 B2
(45) **Date of Patent: *Jun. 20, 2023**

(54) AREAL DENSITY CAPABILITY IMPROVEMENT WITH A MAIN POLE SKIN

(71) Applicant: Western Digital Technologies, Inc., San Jose, CA (US)

(72) Inventors: Suping Song, Fremont, CA (US); Zhanjie Li, Pleasanton, CA (US); Michael Kuok San Ho, Emerald Hills, CA (US); Quang Le, San Jose, CA (US); Alexander M. Zeltser, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,586

(22) Filed: Jul. 19, 2022

(65) Prior Publication Data

US 2022/0358957 A1 Nov. 10, 2022

Related U.S. Application Data

(62) Division of application No. 17/330,176, filed on May 25, 2021, now Pat. No. 11,437,058, which is a (Continued)

(51) Int. Cl.

| | |
|---|---|
| ***G11B 5/127*** | (2006.01) |
| ***G11B 5/31*** | (2006.01) |
| ***G11B 5/23*** | (2006.01) |

(52) U.S. Cl.

CPC .............. *G11B 5/1278* (2013.01); *G11B 5/23* (2013.01); *G11B 5/315* (2013.01); *G11B 5/3116* (2013.01)

(58) Field of Classification Search

CPC ..... G11B 5/3116; G11B 5/1278; G11B 5/314; G11B 5/3133; G11B 5/315;

(Continued)

(56) References Cited

U.S. PATENT DOCUMENTS

| | | | |
|---|---|---|---|
| 8,238,059 | B1 | 8/2012 | Tang et al. |
| 8,295,006 | B2 | 10/2012 | Sugano et al. |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Mallary et al. "Head and Media Challenges for 3 Tb/in[2] Microwave-Assisted Magnetic Recording," IEEE Transactions on Magnetics, vol. 50, No. 7, Jul. 2014, 8 pages.

(Continued)

*Primary Examiner* — Brian E Miller

(74) *Attorney, Agent, or Firm* — Patterson + Sheridan, LLP; Steven H. VerSteeg

(57) ABSTRACT

The present disclosure generally relates to data storage devices, and more specifically, to a magnetic media drive employing a magnetic recording head. The head includes a main pole at a media facing surface (MFS), a trailing shield at the MFS, and a heavy metal layer disposed between the main pole and the trailing shield at the MFS. Spin-orbit torque (SOT) is generated from the heavy metal layer and transferred to a surface of the main pole as a current passes through the heavy metal layer in a cross-track direction. The SOT executes a torque on the surface magnetization of the main pole, which reduces the magnetic flux shunting from the main pole to the trailing shield. With the reduced (Continued)

magnetic flux shunting from the main pole to the trailing shield, write-ability is improved.

13 Claims, 12 Drawing Sheets

Related U.S. Application Data division of application No. 16/912,572, filed on Jun. 25, 2020, now Pat. No. 11,049,512, which is a division of application No. 16/009,046, filed on Jun. 14, 2018, now Pat. No. 10,734,014.

(60) Provisional application No. 62/606,143, filed on Jun. 23, 2017.

(58) Field of Classification Search
CPC .... G11B 2005/0024; G11B 2005/0008; H01L 43/04; H01L 43/08; H01L 27/222; G11C 11/18; G01R 33/1284
See application file for complete search history.

(56) References Cited

U.S. PATENT DOCUMENTS 8,582,240 B1 11/2013 Chen et al.
8,611,046 B2 12/2013 Wu et al.
8,724,262 B1 5/2014 Koui
9,196,271 B1 11/2015 Shirotori et al.
9,218,828 B1 12/2015 Koui et al.
9,230,571 B1 1/2016 Chen et al.
9,275,672 B2 3/2016 Shiroishi et al.
9,305,583 B1 4/2016 Zhang et al.
9,311,934 B1 4/2016 Shiimoto et al.
9,330,691 B1 5/2016 Narita et al.
9,355,654 B1 5/2016 Mallary
9,361,912 B1 6/2016 Liu et al.
9,368,135 B2 6/2016 Gao
9,466,319 B1 10/2016 Tang et al.
9,626,990 B2 4/2017 Tang et al.
9,666,216 B1 5/2017 Kobayashi et al.
9,881,637 B1 1/2018 Wilson et al.
10,014,012 B1 7/2018 Song et al.
10,032,470 B1 7/2018 Degawa et al.
10,121,497 B1 11/2018 Takahashi et al.
10,157,632 B1 12/2018 Song et al.
10,181,334 B1 1/2019 Song et al.
10,186,284 B2 1/2019 Narita et al.
10,210,888 B1 2/2019 Li et al.
10,236,021 B2 3/2019 Narita et al.
10,276,193 B2 4/2019 Narita et al.
10,325,618 B1 6/2019 Wu et al.
10,366,714 B1 7/2019 Olson et al.
10,734,015 B1 * 8/2020 Song ...................... G11B 5/315
10,891,976 B1 * 1/2021 Song .................... G11B 5/1278
11,437,058 B2 * 9/2022 Song .................... G11B 5/1278
2008/0232001 A1 9/2008 Bonhote et al.
2008/0278861 A1 11/2008 Jiang et al.
2008/0304176 A1 12/2008 Takagishi et al.
2009/0059423 A1 3/2009 Yamada et al.
2009/0310244 A1 12/2009 Shimazawa et al.
2013/0062308 A1 3/2013 Funayama et al.
2013/0063840 A1 3/2013 Koui et al.
2013/0250456 A1 9/2013 Yamada et al.
2014/0139952 A1 5/2014 Takeo et al.
2014/0177100 A1 6/2014 Sugiyama et al.
2014/0177101 A1 6/2014 Koui et al.
2015/0287426 A1 10/2015 Mihajlovic et al.
2015/0310881 A1 * 10/2015 Koui ...................... G11B 5/314 360/235.4
2015/0380022 A1 12/2015 Koui et al.
2016/0027455 A1 1/2016 Kudo et al.
2016/0118065 A1 4/2016 Chen et al.
2017/0077394 A1 3/2017 Saida
2017/0092304 A1 3/2017 Koizumi et al.
2017/0236537 A1 8/2017 Murakami et al.
2017/0309301 A1 10/2017 Takahashi et al.
2018/0268848 A1 9/2018 Narita et al.
2019/0088274 A1 3/2019 Narita et al.
2019/0147907 A1 5/2019 Li et al.
2019/0251992 A1 * 8/2019 Ho ......................... G11B 5/235
2019/0279663 A1 9/2019 Song et al.
2019/0279665 A1 9/2019 Li et al.
2020/0372929 A1 * 11/2020 Le ........................ G11B 5/3133

OTHER PUBLICATIONS

Mihajlovic et al. "Spin Orbit Torque Switching of CoFeB Magnetic Free Layers with Pt and Ta Heavy Metals For SOT MRAM Development," IEEE Magnetics, TMRC 2016, E2, Aug. 17-9, 2016; 2 pages.

Song et al. "Micromagnetic Analysis of Adjacent Track Erasure of Wrapped-Around Shielded PMR Writers," IEEE Transactions on Magnetics, vol. 45, No. 10, Oct. 2009, pp. 3730-3732, DOI: 10.1109/TMAG.2009.2024545.

* cited by examiner

AREAL DENSITY CAPABILITY IMPROVEMENT WITH A MAIN POLE SKIN

CROSS-REFERENCE TO RELATED APPLICATIONS

This application is a divisional of U.S. patent application Ser. No. 17/330,176, filed May 25, 2021, which application is a divisional of U.S. patent application Ser. No. 16/912,572, filed Jun. 25, 2020, which application is a divisional of U.S. patent application Ser. No. 16/009,046, filed Jun. 14, 2018, now issued as U.S. Pat. No. 10,734,014, which application claims priority to U.S. Provisional Patent Application Ser. No. 62/606,143, filed Jun. 23, 2017, all of which herein are incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). For example, a perpendicular magnetic recording (PMR) system records data as magnetizations oriented perpendicular to the plane of a magnetic disk. The magnetic disk has a magnetically soft underlayer covered by a thin magnetically hard top layer. The perpendicular write head has a main pole with a small cross section and a trailing shield (or return pole) having a much larger cross section. A strong, highly concentrated magnetic field emits from the main pole in a direction perpendicular to the magnetic disk surface, magnetizing the magnetically hard top layer. The resulting magnetic flux then travels through the soft underlayer, returning to the trailing shield where the magnetic flux is sufficiently spread out and weak that it will not erase the signal recorded by the main pole when the magnetic flux passes back through the magnetically hard top layer to the trailing shield.

Conventionally, the gap between the main pole and the trailing shield (or a trailing shield hot seed layer that is coupled to the trailing shield) is small, such as between about 20 nanometers (nm) and about 30 nm, in order to increase magnetic field gradients and allow the write head to have a more precise resolution. The gap is typically filled with a non-magnetic electrical insulating material, such as alumina. However, due to the close proximity of the main pole and the trailing shield (or trailing shield hot seed layer), the magnetic flux can shunt from the main pole to the trailing shield (or trailing shield hot seed layer).

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a main pole at a media facing surface (MFS), a trailing shield at the MFS, and a heavy metal layer disposed between the main pole and the trailing shield at the MFS. Spin-orbit torque (SOT) is generated from the heavy metal layer and transferred to a surface of the main pole as a current passes through the heavy metal layer in a cross-track direction. The SOT executes a torque on the surface magnetization of the main pole, which reduces the magnetic flux shunting from the main pole to the trailing shield. With the reduced magnetic flux shunting from the main pole to the trailing shield, write-ability is improved.

In one embodiment, a magnetic recording head includes a main pole, a trailing shield, and a heavy metal layer disposed between the main pole and the trailing shield, wherein the heavy metal layer is in contact with the main pole.

In another embodiment, a magnetic recording head includes a main pole, a trailing shield, an intermediate layer disposed between the main pole and the trailing shield, wherein the intermediate layer is in contact with the main pole, and a heavy metal layer in contact with the intermediate layer.

In another embodiment, a data storage device includes a magnetic write head including a trailing shield hot seed layer, a main pole, and a heavy metal structure surrounding two or more surfaces of the main pole at a media facing surface, wherein the heavy metal structure is in contact with the two or more surfaces of the main pole.

In another embodiment, a magnetic recording head includes a main pole and means for generating spin-orbit torque on a surface of the main pole.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole at a media facing surface (MFS), a trailing shield at the MFS, and a heavy metal layer disposed between the main pole and the trailing shield at the MFS. Spin-orbit torque (SOT) is generated from the heavy metal layer and transferred to a surface of the main pole as a current passes through the heavy metal layer in a cross-track direction. The SOT executes a torque on the surface magnetization of the main pole, which reduces the magnetic flux shunting from the main pole to the trailing shield. With the reduced magnetic flux shunting from the main pole to the trailing shield, write-ability is improved.

The terms “over,” “under,” “between,” and “on” as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer “on” a second layer is in contact with the second layer. Additionally, the relative position of one layer with respect to other layers is provided assuming operations are performed relative to a substrate without consideration of the absolute orientation of the substrate.

Figure 1:
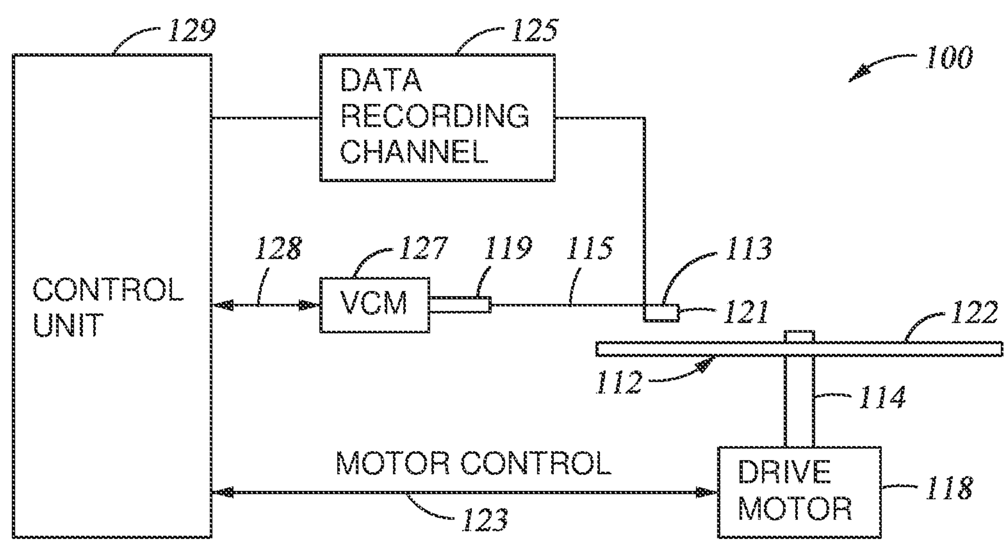
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a heavy metal layer for generating SOT on a surface of a main pole. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
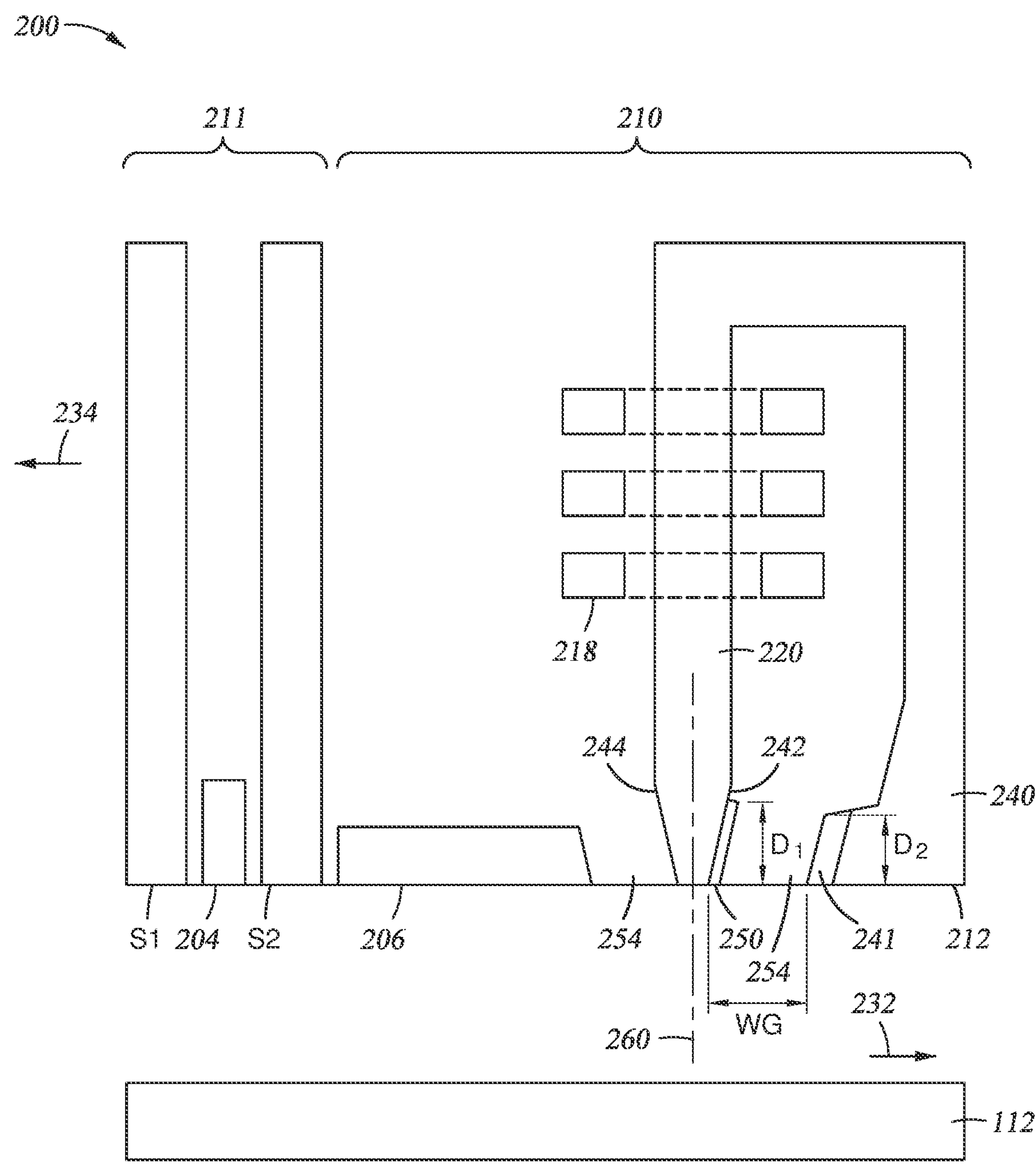
FIG. 2 is a fragmented, cross sectional side view of a read/write head facing a magnetic disk according to one embodiment.

FIG. 2 is a fragmented, cross sectional side view of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a heavy metal layer 250 coupled to the main pole 220, and a coil 218 that excites the main pole 220. The coil 218 may have a “pancake” structure which winds around a back-contact between the main pole 220 and the trailing shield 240, instead of a “helical” structure shown in FIG. 2. A trailing shield hot seed layer 241 is coupled to the trailing shield 240, and the trailing shield hot seed layer 241 faces the heavy metal layer 250. The definition of the term “face” is extended to include a material located between a first element that is facing a second element and the second element. For example, the trailing shield hot seed layer 241 faces the heavy metal layer 250, and a dielectric material 254, such as alumina, is located between the trailing shield hot seed layer 241 and the heavy metal layer 250. The dielectric material 254 is also disposed between the leading shield 206 and the main pole 220. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo alloy. The leading shield 206 and the trailing shield 240 may be a magnetic material, such as NiFe alloy. The trailing shield hot seed layer 241 may include a high moment sputter material, such as CoFeN or FeXN, where X includes at least one of Rh, Al, Ta, Zr, and Ti.

The heavy metal layer 250 may be beta phase Tantalum (β-Ta), beta phase tungsten (β-W), or platinum (Pt). The heavy metal layer 250 is directly coupled to the main pole 220. For example, the heavy metal layer 250 is in direct contact with the trailing taper 242 of the main pole 220, as shown in FIG. 2. In some embodiments, an intermediate layer may be disposed between the heavy metal layer 250 and the main pole 220. In some embodiments, the heavy metal layer 250 is a heavy metal structure that surrounds two or more surfaces of the main pole 220 at the MFS 212, such as three surfaces of the main pole 220. The heavy metal layer 250 extends from the MFS 212 to a location within the write head 210 that is a distance $D_1$ from the MFS 212. The trailing shield hot seed layer 241 extends from the MFS 212 to a location within the write head 210 that is a distance D2 from the MFS 212. The distance $D_1$ is greater than the distance D2 to effectively reduce magnetic flux shunting from the main pole 220 to the trailing shield hot seed layer 241. In one embodiment, the distance $D_1$ ranges from about 10 nm to about 2 microns.

During operation, an electrical current flows through the heavy metal layer 250, which has strong spin-orbit coupling, and the heavy metal layer 250 generates SOT. The SOT generated by the heavy metal layer 250 is transferred to a surface of the main pole 220, such as the trailing taper 242. The SOT effect on the main pole 220 reduces magnetic flux shunting, which improves write-ability, because the SOT executes a torque on the surface magnetization of the main pole 220. The current flows through the heavy metal layer 250 in the cross-track direction, as indicated by the Z-axis. With the reduced magnetic flux shunting from the main pole 220 to the trailing shield 240 (or the trailing shield hot seed layer 241), the write gap WG can be reduced to increase write field gradient. The write gap WG is defined as the distance between the main pole 220 and the trailing shield hot seed layer 241 at the MFS 212, as shown in FIG. 2. The conventional write gap ranges from about 20 nm to about 30 nm. The write gap WG with the heavy metal layer 250 is less than 20 nm. The thickness of the heavy metal layer 250 in the down-track direction (as indicated by X-axis) ranges from about 5 nm to less than about 20 nm, such as about 10 nm.

Figure 3:
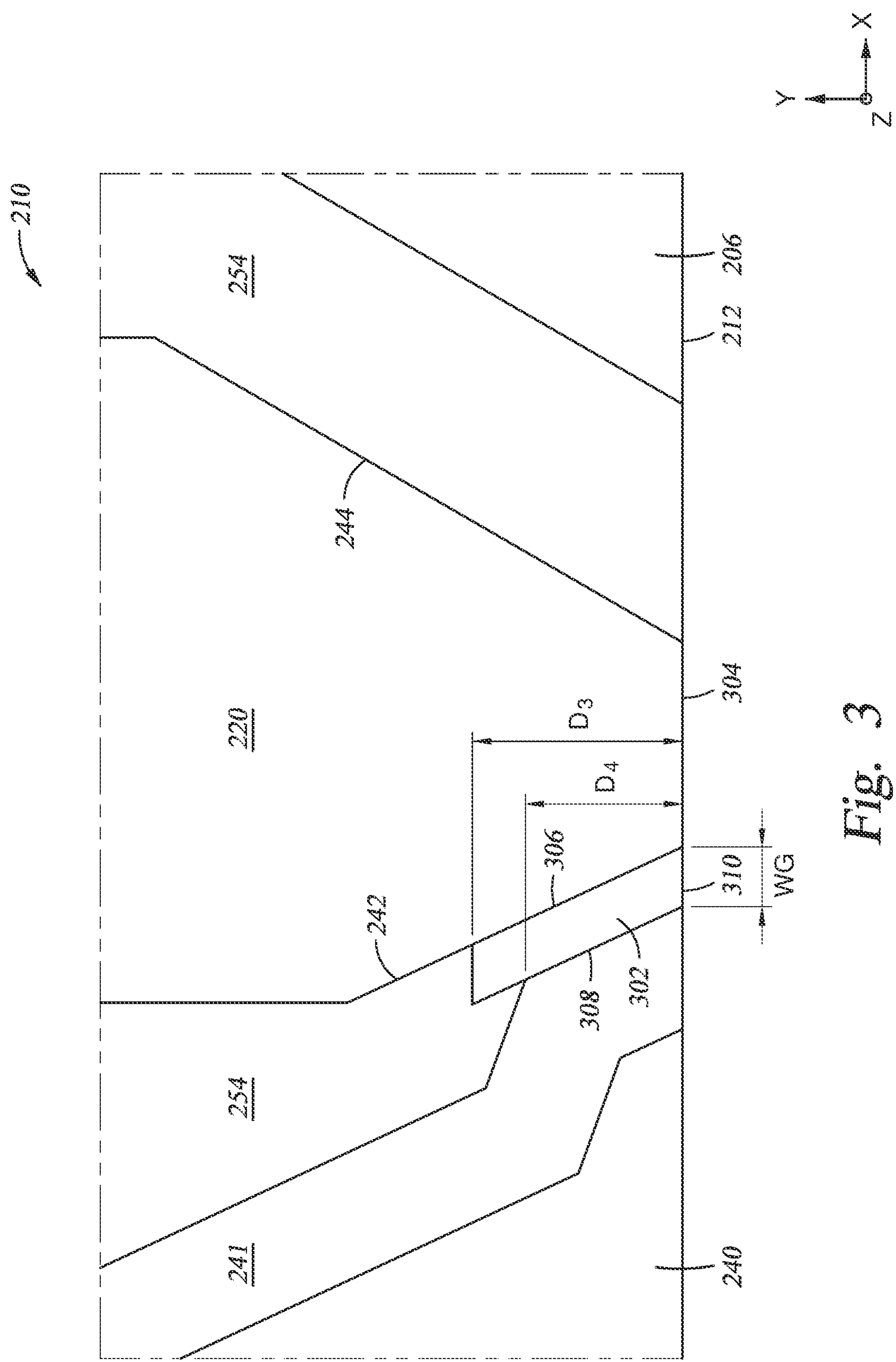
FIG. 3 is a cross sectional side view of a portion of a write head according to one embodiment.

FIG. 3 is a cross sectional side view of a portion of a write head 210 according to one embodiment. As shown in FIG. 3, the write head 210 includes the trailing shield 240, the trailing shield hot seed layer 241, the main pole 220, and the leading shield 206. The main pole includes the trailing taper 242, the leading taper 244 opposite the trailing taper 242, and a first surface 304 connecting the trailing taper 242 and the leading taper 244. The first surface 304 is located at the MFS 212. The write head 210 further includes a heavy metal layer 302 disposed between the trailing shield hot seed layer 241 and the main pole 220. The heavy metal layer is disposed at the MFS 212, as shown in FIG. 3. In some embodiments, the heavy metal layer may be recessed from the MFS 212. The heavy metal layer 302 is fabricated from the same material as the heavy metal layer 250. The dielectric material 254 is disposed between the leading shield 206 and the main pole 220, and the dielectric material 254 extends to the MFS 212 between the leading shield 206 and the main pole 220. The dielectric material 254 disposed between the trailing shield hot seed layer 241 and the main pole 220 does not extend to the MFS 212 and is disposed away from the MFS 212 between the trailing shield hot seed layer 241 and the main pole 220. The heavy metal layer 302 extends to the MFS 212 and is in contact with both main pole 220 and the trailing shield hot seed layer 241.

The heavy metal layer 302 includes a first surface 306 that is in contact with the trailing taper 242 of the main pole 220, a second surface 308 in contact with the trailing shield hot seed layer 241, and a third surface 310 connecting the first surface 306 and the second surface 308. The third surface 310 is at the MFS 212. With the heavy metal layer 302 in contact with both the main pole 220 and the trailing shield hot seed layer 241, the SOT generated from the heavy metal layer 302 is transferred to both the main pole 220 and the trailing shield hot seed layer 241, and the SOT effect on surfaces of the main pole 220 and the trailing shield hot seed layer 241 reduces magnetic flux shunting from the main pole 220 to the trailing shield hot seed layer 241. The SOT executes a torque on the surface magnetization of the main pole 220 and the trailing shield 240 (or the trailing shield hot seed layer 241), which improves write-ability. In some embodiments, the heavy metal layer 302 is a heavy metal structure that surrounds two or more surfaces of the main pole 220, such as three surfaces of the main pole 220.

The heavy metal layer 302 extends from the MFS 212 to a location within the write head 210 that is a distance $D_3$ from the MFS 212. In one embodiment, the distance $D_3$ ranges from about 10 nm to about 2 microns. The portion of the trailing shield hot seed layer 241 that is in contact with the heavy metal layer 302 extends from the MFS 212 to a location within the write head 210 that is a distance D4 from the MFS 212. The distance $D_3$ is greater than the distance D4 to effectively reduce magnetic flux shunting from the main pole 220 to the trailing shield hot seed layer 241. With the reduced magnetic flux shunting from the main pole 220 to the trailing shield 240 (or the trailing shield hot seed layer 241), the write gap WG can be reduced to increase the write field gradient. The write gap WG, which is also the thickness of the heavy metal layer 302 in the down-track direction (as indicated by X-axis), is less than about 20 nm. In one embodiment, the thickness of the heavy metal layer 302 ranges from about 5 nm to less than about 20 nm, such as about 10 nm.

Figure 4A:
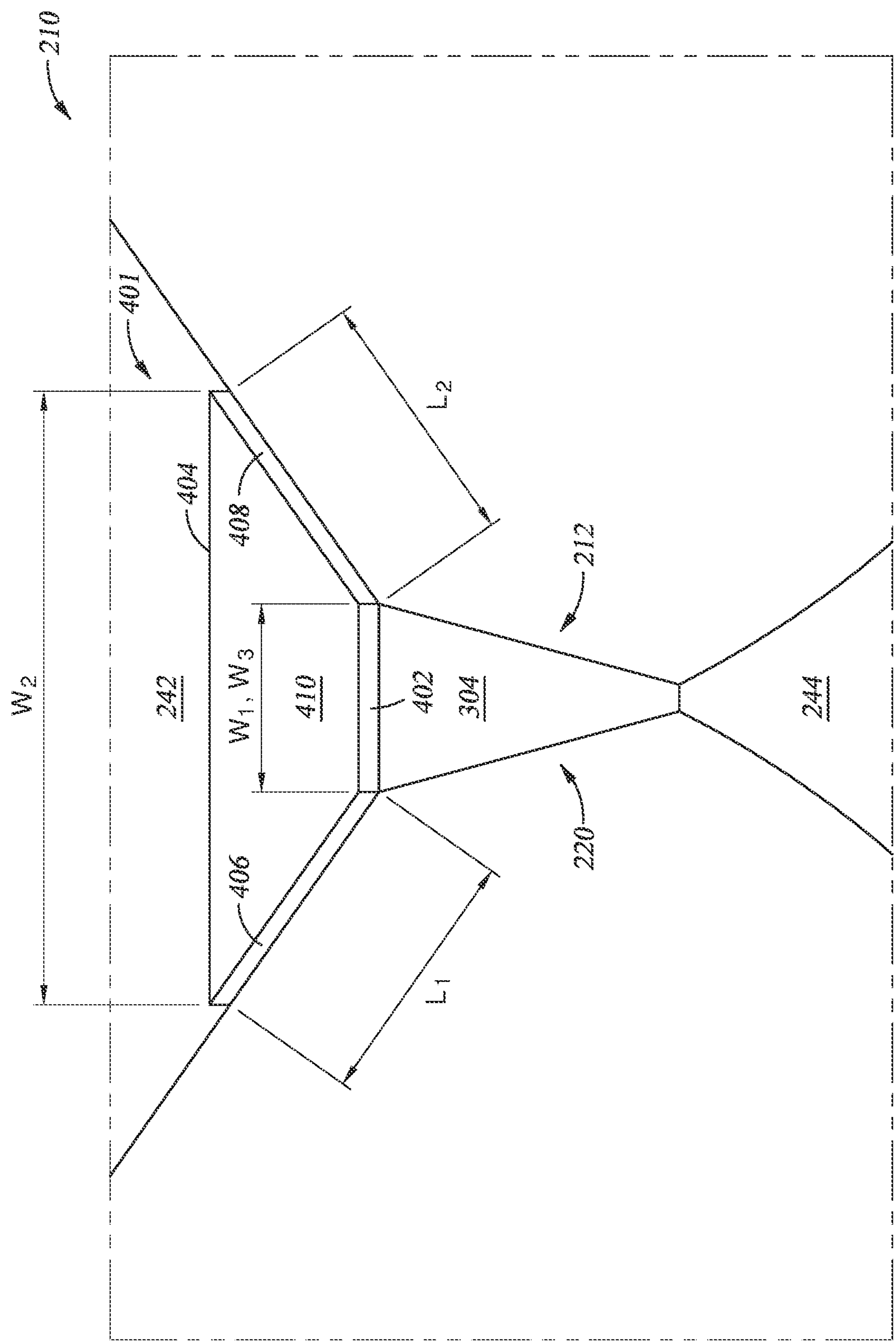
FIGS. 4A-4B are perspective MFS views of a portion of the write head of FIG. 2 according to embodiments.
Figure 4B:
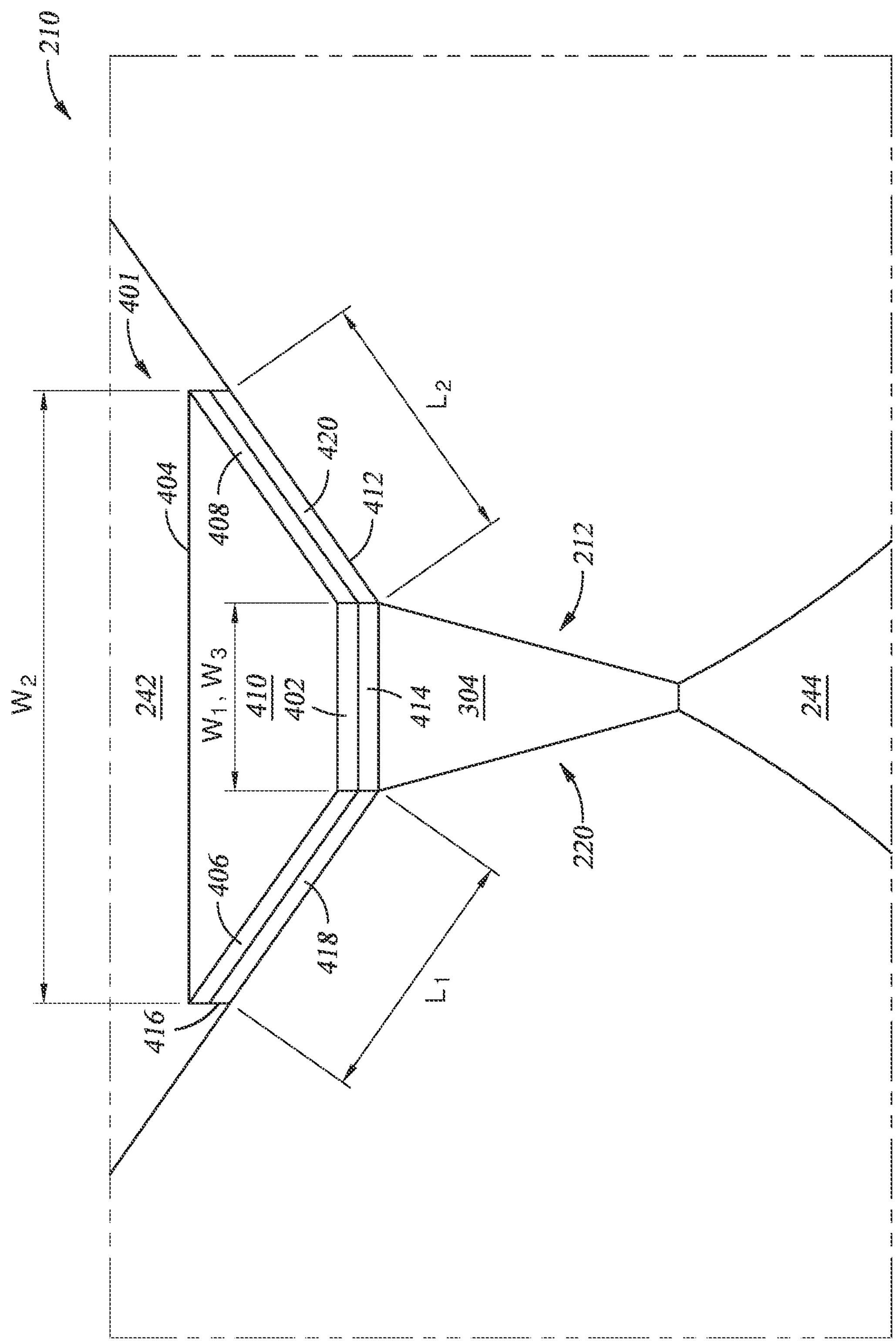

FIGS. 4A-4B are perspective MFS views of a portion of the write head 210 of FIG. 2 according to at least one embodiment. The dielectric material 254 is omitted in FIGS. 4A and 4B for better illustration. As shown in FIG. 4A, the write head 210 includes the main pole 220 and a heavy metal layer 401 coupled to the main pole 220. The heavy metal layer 401 is fabricated from the same material as the heavy metal layer 250. The heavy metal layer 401 is disposed between the main pole 220 and the trailing shield hot seed layer 241 (FIG. 2). The heavy metal layer 401 includes a first surface 402 at the MFS 212, a second surface 404 opposite the first surface 402, a third surface 406 connecting the first surface 402 and the second surface 404, a fourth surface 408 opposite the third surface 406, and a fifth surface 410 connecting the first, second, third, and fourth surfaces 402, 404, 406, 408. In one embodiment, the fifth surface 410 faces the trailing shield hot seed layer 241, and the heavy metal layer 401 has a first thickness (in the down-track direction) ranging from about 5 nm to less than about 20 nm. The dielectric material 254 is disposed between the surface 410 and the trailing shield hot seed layer 241 (FIG. 2). In another embodiment, the fifth surface 410 is in contact with the trailing shield hot seed layer 241 (FIG. 3), and the heavy metal layer 401 has a second thickness (in the down-track direction) ranging from about 5 nm to less than about 20 nm. The second thickness is greater than the first thickness.

The first surface 402 of the heavy metal layer 401 is co-planar with the surface 304 of the main pole 220, and the first surface 402 has a width $W_1$ (in the cross-track direction). The second surface 404 is located within the write head 210 at a distance from the MFS 212. The distance may be the distance $D_1$ (FIG. 2) or distance $D_3$ (FIG. 3). The second surface 404 has a width $W_2$ (in the cross-track direction) that is substantially greater than the width $W_1$. The trailing taper 242 of the main pole 220 has a width $W_3$ (in the cross-track direction) at the MFS 212, and the width $W_3$ is substantially the same as the width $W_1$ of the first surface 402 of the heavy metal layer 401. The third surface 406 has a length $L_1$ (in a direction from the MFS 212 into the write head 210) and the fourth surface 408 has a length $L_2$ (in a direction from the MFS 212 into the write head 210). The heavy metal layer 401 is in contact with the trailing taper 242 and conforms to the shape of the trailing taper 242. In one embodiment, the heavy metal layer 401 has a trapezoidal shape. In one embodiment, the length $L_1$ of the third surface 406 is substantially the same as the length $L_2$ of the fourth surface 408, and the heavy metal layer 401 has an isosceles trapezoidal shape. The length $L_1$ of the third surface 406 may be different from the length $L_2$ of the fourth surface 408. The heavy metal layer 401 may be the heavy metal layer 250 (FIG. 2) or the heavy metal layer 302 (FIG. 3).

FIG. 4B is a perspective MFS view of a portion of the write head 210 of FIG. 2 according to another embodiment. As shown in FIG. 4B, an intermediate layer 412 is disposed between the heavy metal layer 401 and the main pole 220. The intermediate layer 412 is in contact with the trailing taper 242 of the main pole 220 and the heavy metal layer 401. As the current flows through the heavy metal layer 401, there can be current shunting from the heavy metal layer 401 to the main pole 220 and the trailing shield hot seed layer 241. In order to reduce current shunting from the heavy metal layer 401 to the main pole 220 and the trailing shield hot seed layer 241, the intermediate layer 412 is utilized. The intermediate layer 412 is a magnetic material having a high electrical resistivity. For example, the intermediate layer 412 is fabricated from Fe—Co-M, where M is one or more of the following: B, Si, P, Al, Hf, Zr, Nb, Ti, Ta, Mo, Mg, Y, Cu, Cr, and Ni. In another example, the intermediate layer 412 is fabricated from Fe—Co-M-MeO$_x$ granular film, where Me is Si, Al, Hf, Zr, Nb, Ti, Ta, Mg, Y, or Cr and M is one or more of the following: B, Si, Al, Hf, Zr, Nb, Ti, Ta, Mo, Mg, Y, Cu, Cr, and Ni. In another example, the intermediate layer 412 is fabricated from (Fe—Co-M-MeO$_x$)$_n$ multilayer film, where Me is Si, Al, Hf, Zr, Nb, Ti, Ta, Mg, Y, or Cr and M is one or more of the following: B, Si, Al, Hf, Zr, Nb, Ti, Ta, Mo, Mg, Y, Cu, Cr, and Ni. In another example, the intermediate layer 412 is fabricated from Ni—Mn—Mg—Zn—FeO$_x$ soft ferrites. In another example, the intermediate layer 412 is fabricated from Fe—Co-M-(Ni—Mn—Mg—Zn—FeO$_x$) granular film, where M is one or more of the following: B, Si, P, Al, Hf, Zr, Nb, Ti, Ta, Mo, Mg, Y, Cu, Cr, and Ni. In another example, the intermediate layer 412 is fabricated from Fe—Co-M-(Ni—Mn—Mg—Zn—FeO$_x$)$_n$ multilayer film, where M is one or more of the following: B, Si, P, Al, Hf, Zr, Nb, Ti, Ta, Mo, Mg, Y, Cu, Cr, and Ni. In embodiment, the intermediate layer 412 is fabricated from $Co_{19.5}Fe_{53}Hf_8O_{19.5}$. The intermediate layer 412 has a higher electrical resistivity than the heavy metal layer 401. The intermediate layer 412 is fabricated from a magnetic material to magnetically exchange couple to the main pole and the trailing shield. The intermediate layer 412 may be disposed between the heavy metal layer 250 and the main pole 220 (FIG. 2). The intermediate layer 412 may be disposed between the heavy metal layer 302 and the main pole 220 and between the heavy metal layer 302 and the trailing shield hot seed layer 241 (FIG. 3).

The intermediate layer 412 has the same shape as the heavy metal layer 401. The intermediate layer 412 has the first surface 414 at the MFS, a second surface 416 opposite the first surface 414, a third surface 418 connecting the first surface 414 and the second surface 416, and a fourth surface 420 opposite the third surface 418. The first surface 414 of the intermediate layer 412 is co-planar with the first surface 402 of the heavy metal layer 401, the second surface 416 is co-planar with the second surface 404 of the heavy metal layer 401, the third surface 418 is co-planar with the third surface 406 of the heavy metal layer 401, and the fourth surface 420 is co-planar with the fourth surface 408.

Figure 5A:
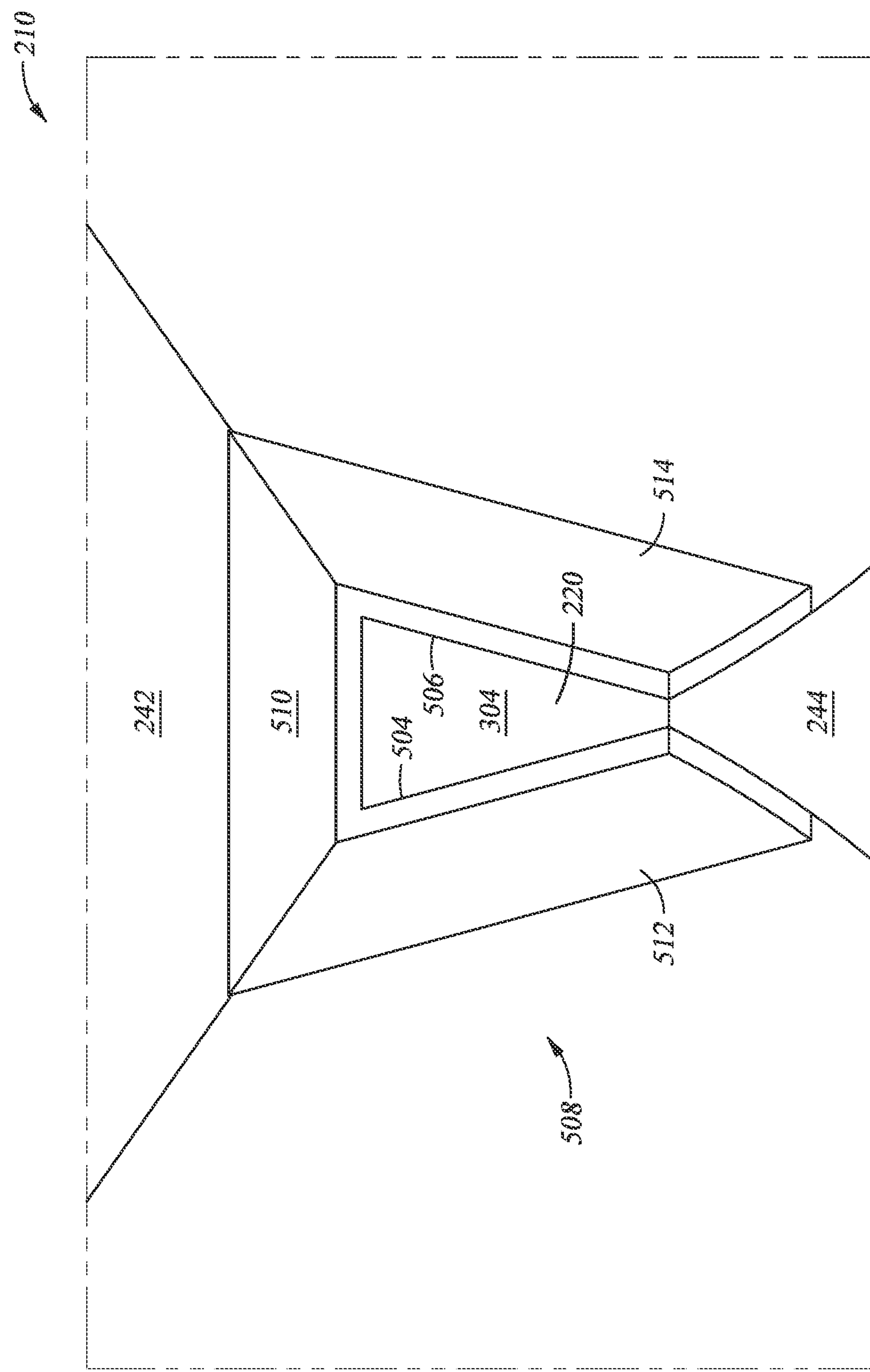
FIGS. 5A-5B are perspective MFS views of a portion of the write head of FIG. 2 according to embodiments.
Figure 5B:
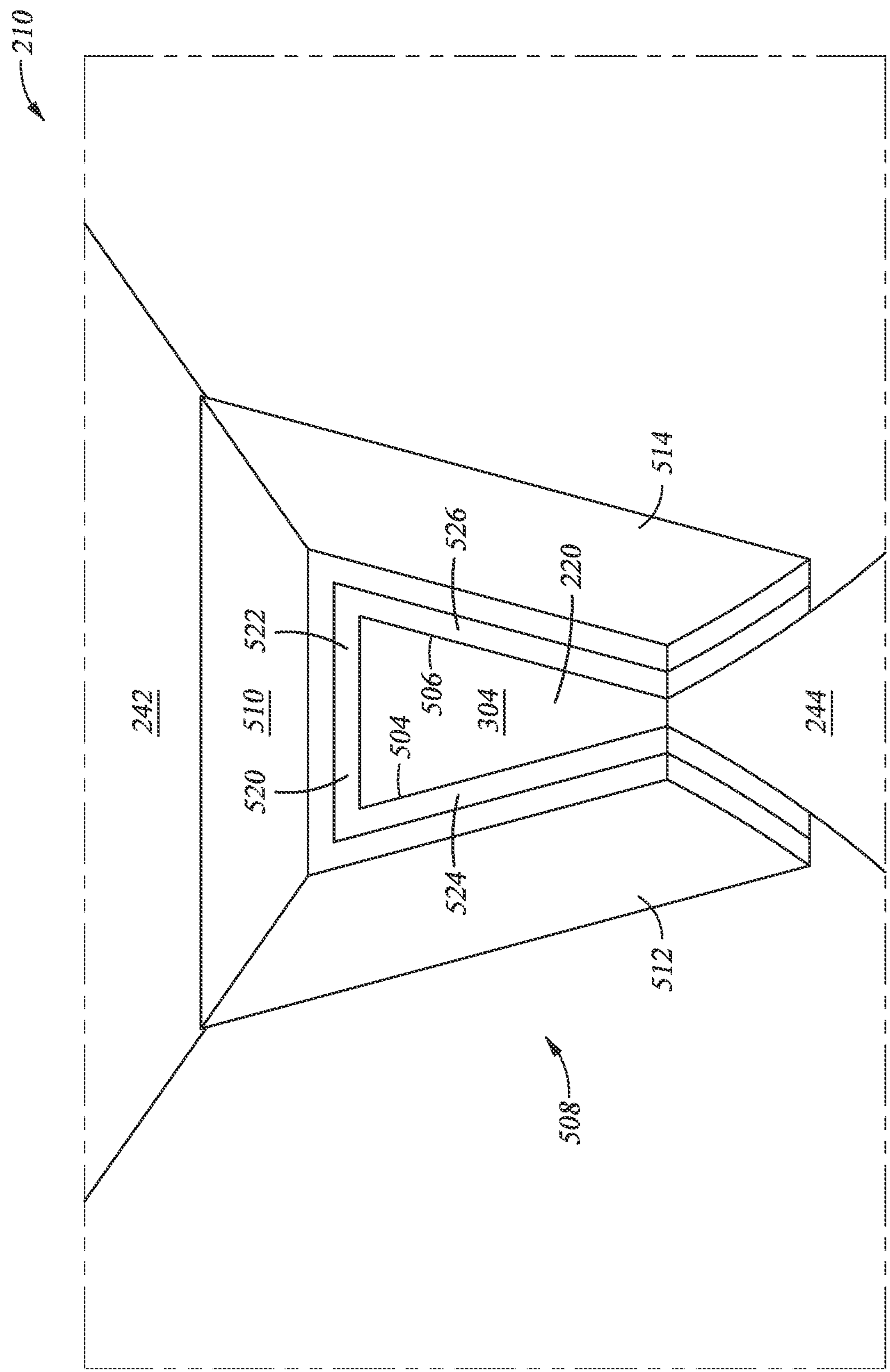

FIGS. 5A-5B are perspective MFS views of a portion of the write head of FIG. 2 according to at least one embodiment. The dielectric material 254 is omitted in FIGS. 5A and 5B for better illustration. As shown in FIG. 5A, the main pole 220 includes the trailing taper 242, the leading taper 244 opposite the trailing taper 242, the first surface 304 at the MFS, a second surface 504 connecting the trailing taper 242 and the leading taper 244, and a third surface 506 opposite the second surface 504. The write head 210 further includes a heavy metal structure 508 disposed at the MFS 212. The heavy metal structure 508 is fabricated from the same material as the heavy metal layer 250. The heavy metal structure surrounding two or more surfaces of the main pole 220. In one embodiment, as shown in FIG. 5A, the heavy metal structure 508 surrounds three surfaces of the main pole 220 at the MFS 212.

The heavy metal structure 508 includes a first portion 510 in contact with the trailing taper 242, a second portion 512 connected to the first portion 510, and a third portion 514 opposite the second portion 512. In one embodiment, the first portion 510 faces the trailing shield hot seed layer 241, and the first portion 510 has a first thickness (in the down-track direction) ranging from about 5 nm to less than about 20 nm. The dielectric material 254 is disposed between the first portion 510 and the trailing shield hot seed layer 241 (FIG. 2). In another embodiment, the first portion 510 is in contact with the trailing shield hot seed layer 241 (FIG. 3), and the first portion 510 has a second thickness (in the down-track direction) ranging from about 5 nm to less than about 20 nm. The second thickness is greater than the first thickness. The first portion 510 is in contact with the trailing taper 242 and conforms to the shape of the trailing taper 242. The second portion 512 is in contact with the second surface 504 and conforms to the shape of the second surface 504 of the main pole 220. The third portion 514 is in contact with the third surface 506 and conforms to the shape of the third surface 506 of the main pole 220. In one embodiment, the first portion 510, the second portion 512, and the third portion 514 are trapezoidal. The leading taper 244 is not surrounded by the heavy metal structure 508. The leading taper 244 is in contact with the dielectric material 254 (FIG. 2). The heavy metal structure 508 may replace the heavy metal layer 250 (FIG. 2) or the heavy metal layer 302 (FIG. 3).

FIG. 5B is a perspective MFS view of a portion of the write head 210 of FIG. 2 according to another embodiment. As shown in FIG. 5B, an intermediate layer 520 is disposed between the heavy metal structure 508 and the main pole 220. The intermediate layer 520 is in contact with two or more surfaces of the main pole 220 and the heavy metal structure 508. The intermediate layer 520 is fabricated from the same material as the intermediate layer 412. The intermediate layer 520 is utilized to reduce current shunting from the heavy metal structure 508 to the main pole 220 and the trailing shield hot seed layer 241. As shown in FIG. 5B, the intermediate layer 520 has a first portion 522 in contact with the trailing taper 242, a second portion 524 connected to the first portion 522, and a third portion 526 opposite the second portion 524. The second portion 524 is in contact with the second surface 504 of the main pole 220, and the third portion 526 is in contact with the third surface 506 of the main pole 220. The first portion 522 is sandwiched between the trailing taper 242 and the first portion 510 of the heavy metal structure 508, the second portion 524 is sandwiched between the second surface 504 of the main pole 220 and the second portion 512 of the heavy metal structure 508, and the third portion 526 is sandwiched between the third surface 506 of the main pole 220 and the third portion 514 of the heavy metal structure 508. The first portion 522 of the intermediate layer 520 has the same shape as the first portion 510 of the heavy metal structure 508, the second portion 524 of the intermediate layer 520 has the same shape as the second portion 512 of the heavy metal structure 508, and the third portion 526 of the intermediate layer 520 has the same shape as the third portion 514 of the heavy metal structure 508. The intermediate layer 520 surrounds at least two surfaces of the main pole 220 at the MFS 212, and the heavy metal structure 508 surrounds the intermediate layer 520. The leading taper 244 is not surrounded by the intermediate structure 520. The leading taper 244 is in contact with the dielectric material 254 (FIG. 2).

Figure 6A:
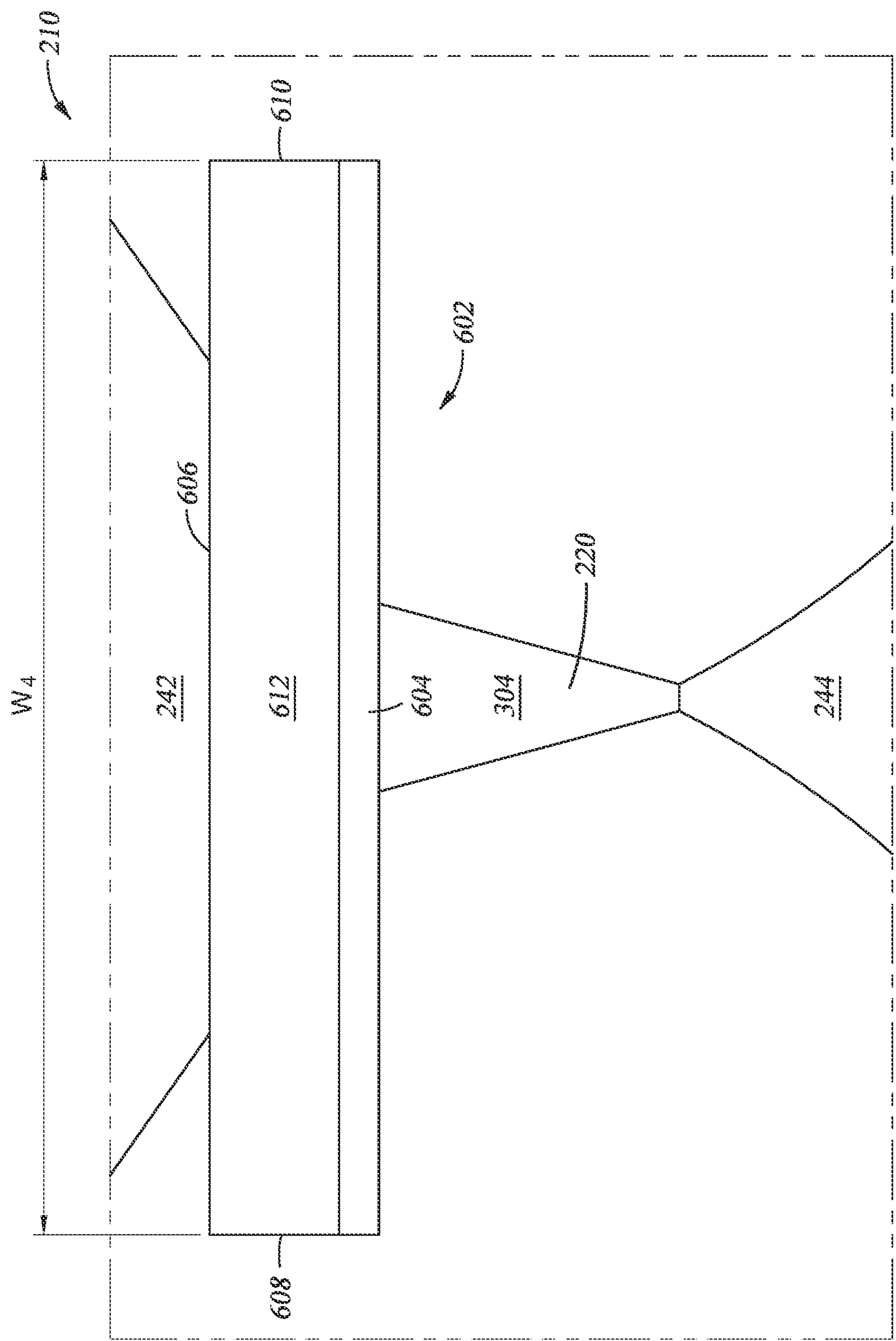
FIGS. 6A-6C are perspective MFS views and a zoomed in view of a portion of the write head of FIG. 2 according to embodiments.
Figure 6B:
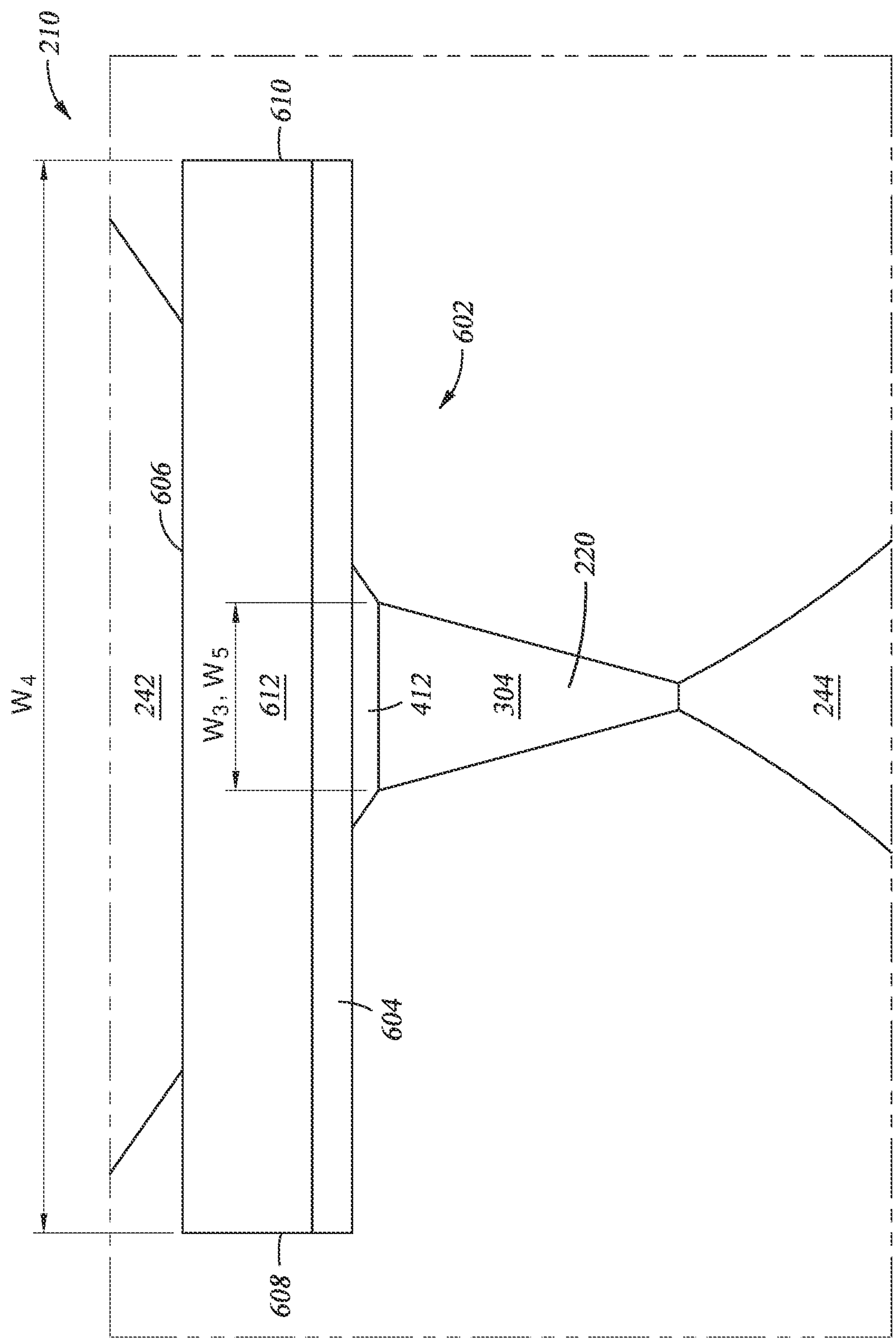
Figure 6C:
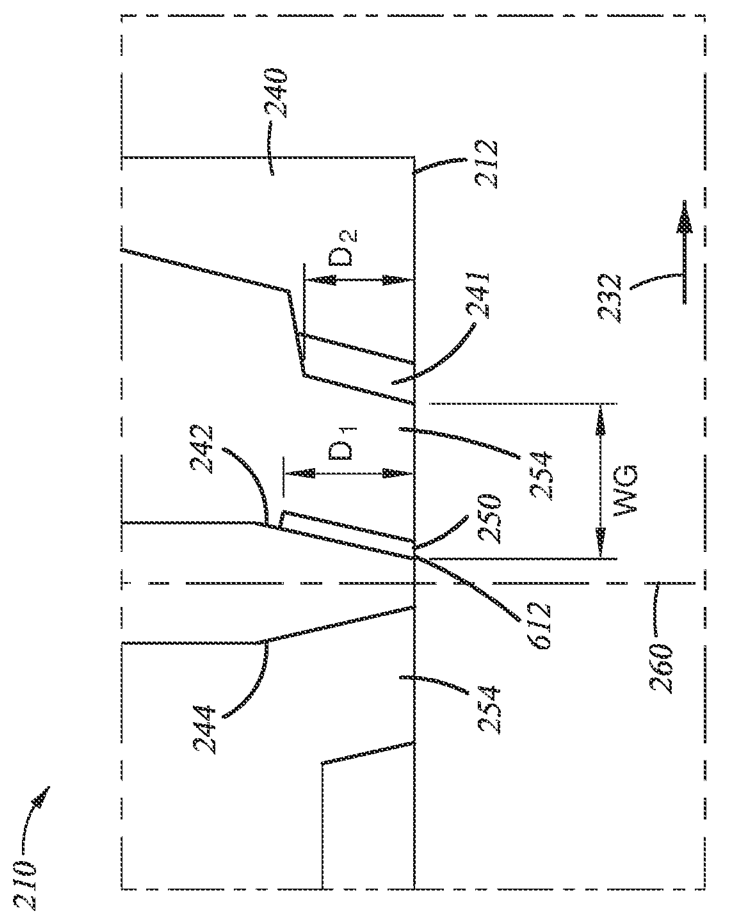

FIGS. 6A-6B are perspective MFS views of a portion of the write head 210 of FIG. 2 according to at least one embodiment. The dielectric material 254 is omitted in FIGS. 6A and 6B for better illustration. As shown in FIG. 6A, the write head 210 includes the main pole 220 and a heavy metal layer 602 coupled to the main pole 220. The heavy metal layer 602 is fabricated from the same material as the heavy metal layer 250. The heavy metal layer 602 is disposed between the main pole 220 and the trailing shield hot seed layer 241 (FIG. 2). The heavy metal layer 602 includes a first surface 604 at the MFS 212, a second surface 606 opposite the first surface 604, a third surface 608 connecting the first surface 604 and the second surface 606, a fourth surface 610 opposite the third surface 608, and a fifth surface 612 connecting the first, second, third, and fourth surfaces 604, 606, 608, 610. In one embodiment, the fifth surface 612 faces the trailing shield hot seed layer 241, and the heavy metal layer 602 has a first thickness (in the down-track direction) ranging from about 5 nm to less than about 20 nm. The dielectric material 254 is disposed between the fifth surface 612 and the trailing shield hot seed layer 241 (FIG. 2). In another embodiment, the fifth surface 612 is in contact with the trailing shield hot seed layer 241 (FIG. 3), and the heavy metal layer 602 has a second thickness (in the down-track direction) ranging from about 5 nm to less than about 20 nm. The second thickness is greater than the first thickness.

The first surface 604 of the heavy metal layer 602 is co-planar with the surface 304 of the main pole 220. The second surface 606 is located within the write head 210 at a distance from the MFS 212. The distance may be the distance $D_1$ (FIG. 2) or distance $D_3$ (FIG. 3). The heavy metal layer 602 does not conform to the shape of the trailing taper 242. In one embodiment, the first surface 604 is substantially parallel to the second surface 606, and the third surface 608 is substantially parallel to the fourth surface 610. In one embodiment, the heavy metal layer 602 has a rectangular shape, as shown in FIG. 6A. The heavy metal layer 602 may be the heavy metal layer 250 (FIG. 2) or the heavy metal layer 302 (FIG. 3).

FIG. 6B is a perspective MFS view of a portion of the write head 210 of FIG. 2 according to another embodiment. As shown in FIG. 6B, the intermediate layer 412 is disposed between the heavy metal layer 602 and the main pole 220. The intermediate layer 412 is in contact with the main pole 220 and the heavy metal layer 602. The intermediate layer 412 is utilized to reduce current shunting from the heavy metal layer 602 to the main pole 220 and the trailing shield hot seed layer 241. The intermediate layer 412 conforms to the shape of the trailing taper 242. The trailing taper 242 has the width $W_3$ at the MFS 212, the surface 604 of the heavy metal layer 602 has a width W4 (in the cross-track direction) at the MFS 212, and the surface 414 of the intermediate layer 412 has a width W5 (in the cross-track direction) at the MFS 212. The width W4 is substantially greater than the width $W_3$. In one embodiment, the width W5 is substantially the same as the width $W_3$. In some embodiments, the intermediate layer 412 conforms to the shape of the heavy metal layer 602. In one embodiment, the intermediate layer 412 is rectangular and the width W5 is substantially the same as the width W4. The intermediate layer 412 may be disposed between the heavy metal layer 602 and the main pole 220 and between the heavy metal layer 602 and the trailing shield hot seed layer 241 (FIG. 3).

Figure 7A:
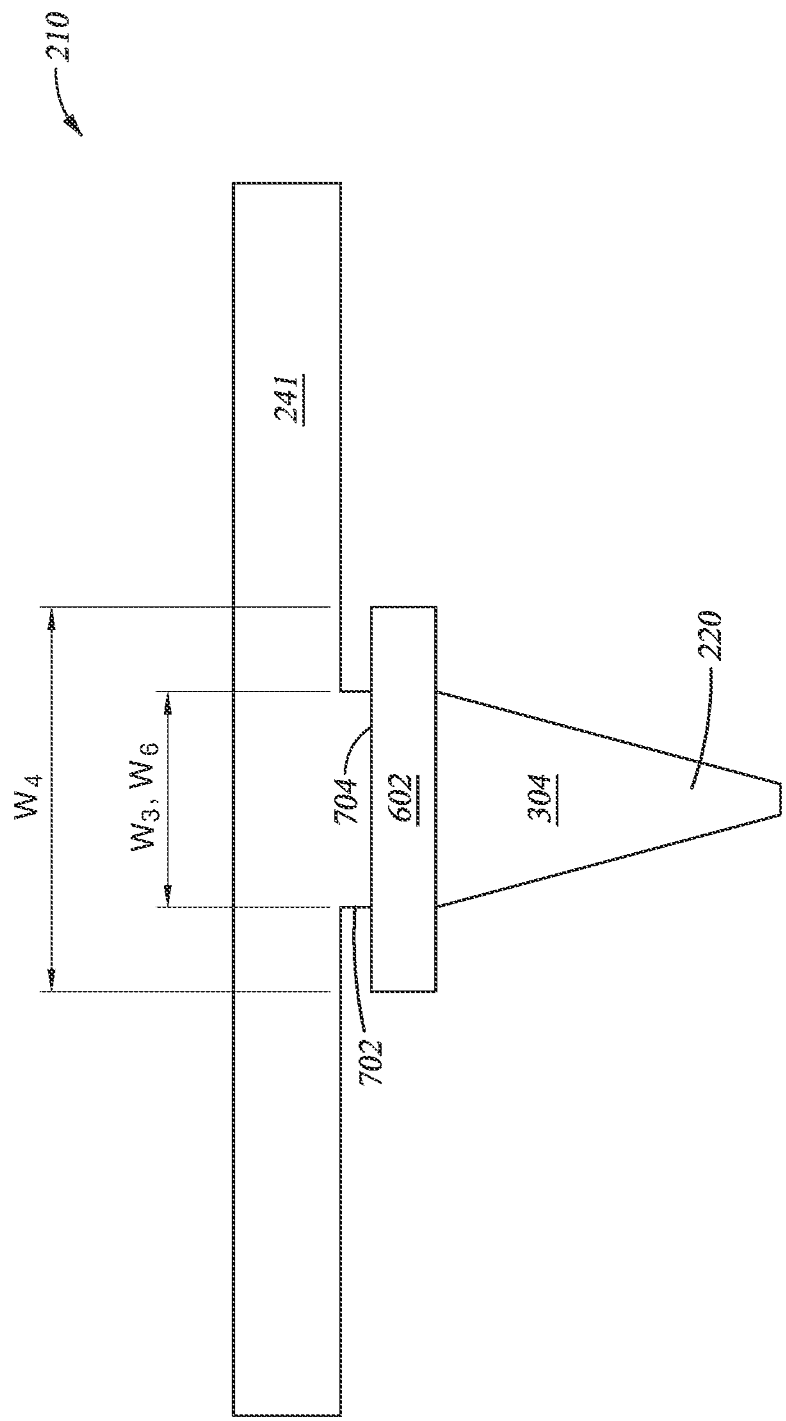
FIGS. 7A-7B are MFS views of a portion of the write head of FIG. 2 according to embodiments.
Figure 7B:
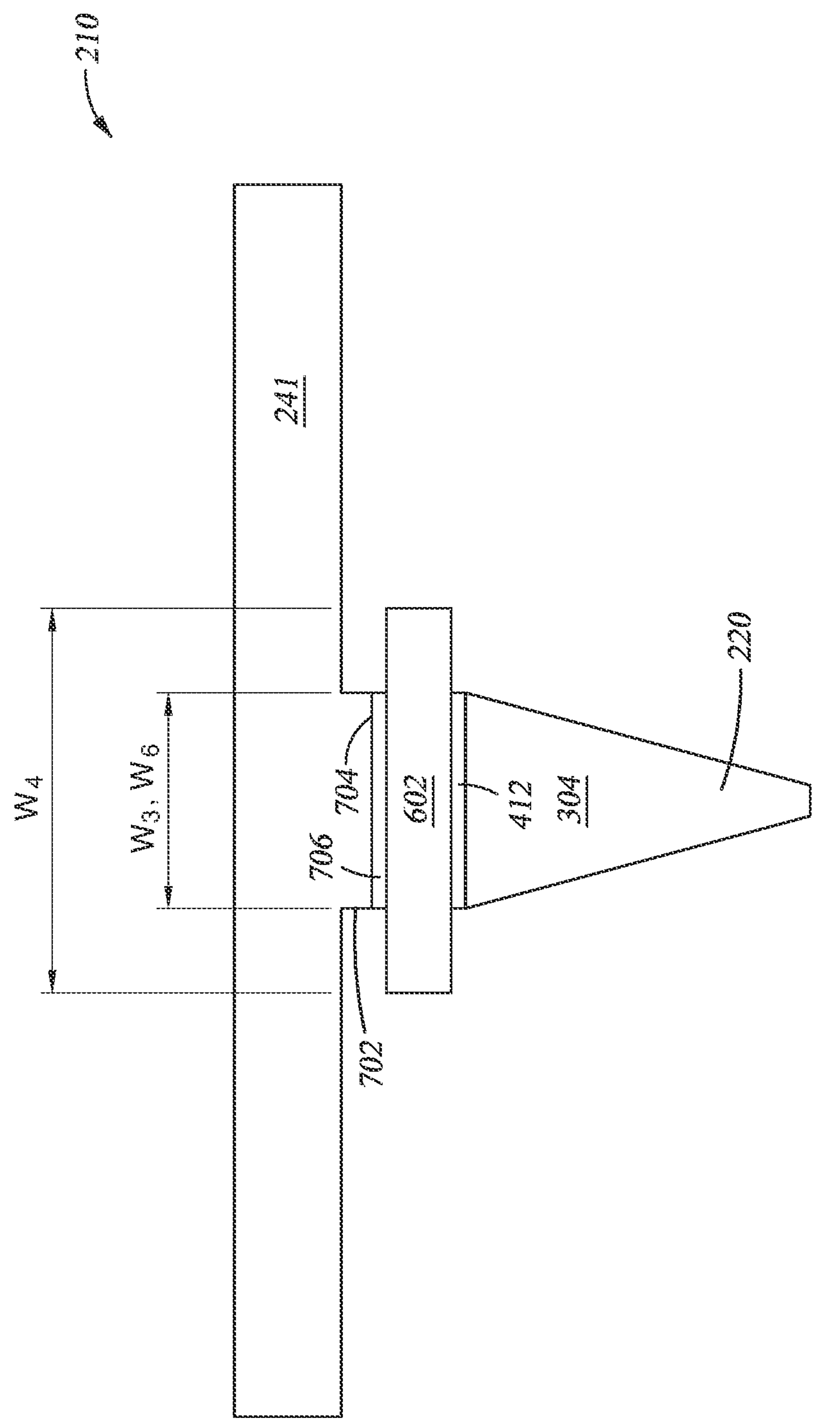

FIGS. 7A-7B are MFS views of a portion of the write head 210 of FIG. 2 according to at least one embodiment. The dielectric material 254 is omitted in FIGS. 6A and 6B for better illustration. As shown in FIG. 7A, the write head 210 includes the trailing shield hot seed layer 241, the main pole 220, and the heavy metal layer 602 disposed between the trailing shield hot seed layer 241 and the main pole 220. The trailing shield hot seed layer 241 includes a notch 702, and the notch 702 includes a surface 704 in contact with the heavy metal layer 602. The surface 704 of the notch 702 has a width $W_6$ (in the cross-track direction) at the MFS 212, and the width $W_6$ is substantially less than the width W4 of the heavy metal layer 602. In one embodiment, the width $W_6$ is substantially the same as the width $W_3$ of the main pole.

FIG. 7B is a perspective MFS view of a portion of the write head 210 of FIG. 2 according to another embodiment. As shown in FIG. 7B, the intermediate layer 412 is disposed between the heavy metal layer 602 and the main pole 220. A second intermediate layer 706 is disposed between the heavy metal layer 602 and the notch 702 of the trailing shield hot seed layer 241. The intermediate layer 706 is fabricated from the same material as the intermediate layer 241. In one embodiment, the intermediate layer 706 conforms to the shape of the surface 704 of the notch 702. In another embodiment, the intermediate layer 706 conforms to the shape of the heavy metal layer 602. In one embodiment, the intermediate layer 706 has the same shape as the intermediate layer 412. The intermediate layer 706 reduces current shunting from the heavy metal layer 602 to the trailing shield hot seed layer 241.

The benefits of having a heavy metal layer or structure disposed between the main pole and the trailing shield (or trailing shield hot seed layer) are to reduce magnetic flux shunting from the main pole to the trailing shield. Furthermore, an intermediate layer made of a magnetic material having high electrical resistivity can be disposed between the heavy metal layer and the main pole and between the heavy metal layer and the trailing shield (trailing shield hot seed layer) to reduce current shunting from the heavy metal layer to the main pole and the trailing shield. With reduced current shunting, the SOT generated by the heavy metal layer or structure is more effective, resulting in improved write-ability.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
- a main pole having a surface at a media facing surface (MFS);
- a trailing shield;
- a heavy metal layer disposed between the main pole and the trailing shield, the heavy metal layer comprising a material selected from the group consisting of beta phase tantalum, beta phase tungsten, and platinum, wherein:
  - a first surface of the heavy metal layer is at the MFS,
  - a second surface of the heavy metal layer is opposite the first surface,
  - a third surface of the heavy metal layer connects the first surface to the second surface,
  - a fourth surface of the heavy metal layer is opposite the third surface, and
  - a fifth surface of the heavy metal layer connects the first, second, third, and fourth surfaces; and
- a dielectric material disposed between the fifth surface and a trailing shield hot seed layer.

2. The magnetic recording head of claim 1, wherein the fifth surface has a thickness of between about 5 nm and about 20 nm.

3. The magnetic recording head of claim 1, wherein the first surface is coplanar with the main pole.

4. A magnetic recording head, comprising:
- a main pole having a surface at a media facing surface (MFS);
- a trailing shield; and
- a heavy metal layer disposed between the main pole and the trailing shield, the heavy metal layer comprising a material selected from the group consisting of beta phase tantalum, beta phase tungsten, and platinum, wherein:
  - a first surface of the heavy metal layer is at the MFS,
  - a second surface of the heavy metal layer is opposite the first surface,
  - a third surface of the heavy metal layer connects the first surface to the second surface,
  - a fourth surface of the heavy metal layer is opposite the third surface, and
  - a fifth surface of the heavy metal layer connects the first, second, third, and fourth surfaces, wherein the fifth surface is in contact with a trailing shield hot seed layer.

5. The magnetic recording head of claim 4, wherein the fifth surface has a thickness of between about 5 nm and about 20 nm.

6. The magnetic recording head of claim 4, wherein the first surface is coplanar with the main pole.

7. A magnetic recording head, comprising:
- a main pole having a surface at a media facing surface (MFS);
- a trailing shield;
- a heavy metal layer disposed between the main pole and the trailing shield, the heavy metal layer comprising a material selected from the group consisting of beta phase tantalum, beta phase tungsten, and platinum, wherein:
  - a first surface of the heavy metal layer is at the MFS,
  - a second surface of the heavy metal layer is opposite the first surface,
  - a third surface of the heavy metal layer connects the first surface to the second surface,
  - a fourth surface of the heavy metal layer is opposite the third surface, and
  - a fifth surface of the heavy metal layer connects the first, second, third, and fourth surfaces; and
- an intermediate layer disposed between the heavy metal layer and the main pole.

8. The magnetic recording head of claim 7, wherein the fifth surface has a thickness of between about 5 nm and about 20 nm.

9. The magnetic recording head of claim 7, wherein the first surface is coplanar with the main pole.

10. The magnetic recording head of claim 7, wherein the heavy metal layer does not conform to a shape of a trailing taper of the trailing shield.

11. The magnetic recording head of claim 7, wherein the intermediate layer conforms to a shape of a trailing shape of the trailing shield.

12. The magnetic recording head of claim 7, wherein the intermediate layer comprises a material selected from the group consisting of Fe—Co-M, Fe—Co-M-Me$O_x$ granular film, (Fe—Co-M-Me$O_x$)$_n$ multilayer film, Ni—Mn—Mg—Zn—Fe$O_x$ soft ferrites, Fe—Co-M-(Ni—Mn—Mg—Zn—Fe$O_x$) granular film, and Fe—Co-M-(Ni—Mn—Mg—Zn—Fe$O_x$)n multilayer film, wherein M is one or more of the following: B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr.

13. A magnetic media device comprising a magnetic recording head, the magnetic recording head comprising:
- a main pole having a surface at a media facing surface (MFS);
- a trailing shield;
- a heavy metal layer disposed between the main pole and the trailing shield, the heavy metal layer comprising a material selected from the group consisting of beta phase tantalum, beta phase tungsten, and platinum, wherein:
  - a first surface of the heavy metal layer is at the MFS,
  - a second surface of the heavy metal layer is opposite the first surface,
  - a third surface of the heavy metal layer connects the first surface to the second surface,
  - a fourth surface of the heavy metal layer is opposite the third surface, and
  - a fifth surface of the heavy metal layer connects the first, second, third, and fourth surfaces; and;
- an intermediate layer disposed between the heavy metal layer and the main pole.

* * * * *